C. J. WESTON.
DUMP CAR.
APPLICATION FILED APR. 11, 1912.
1,058,649.
Patented Apr. 8, 1913.
2 SHEETS—SHEET 1.
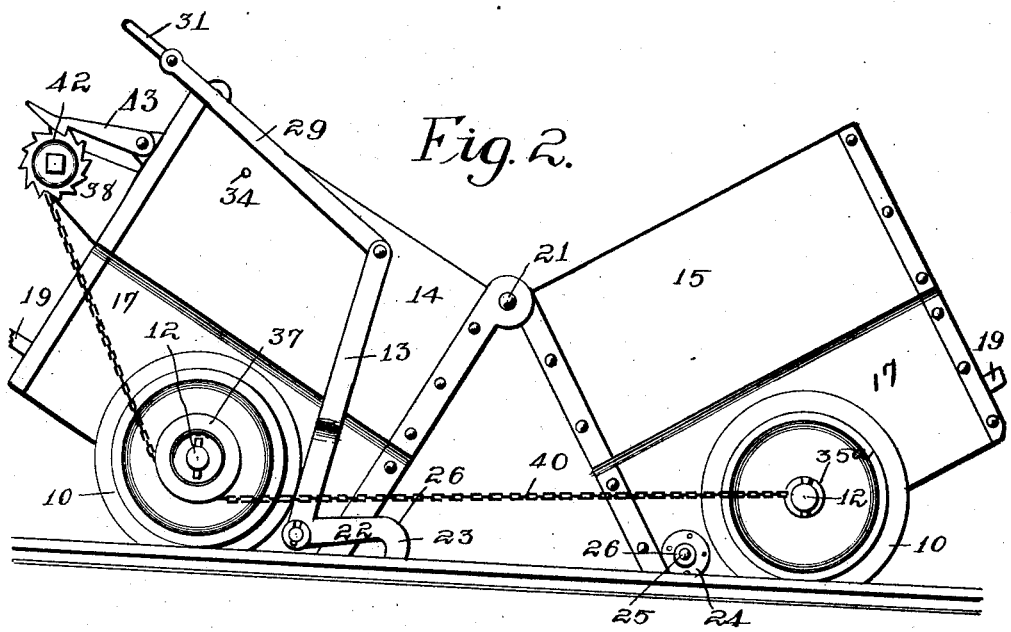
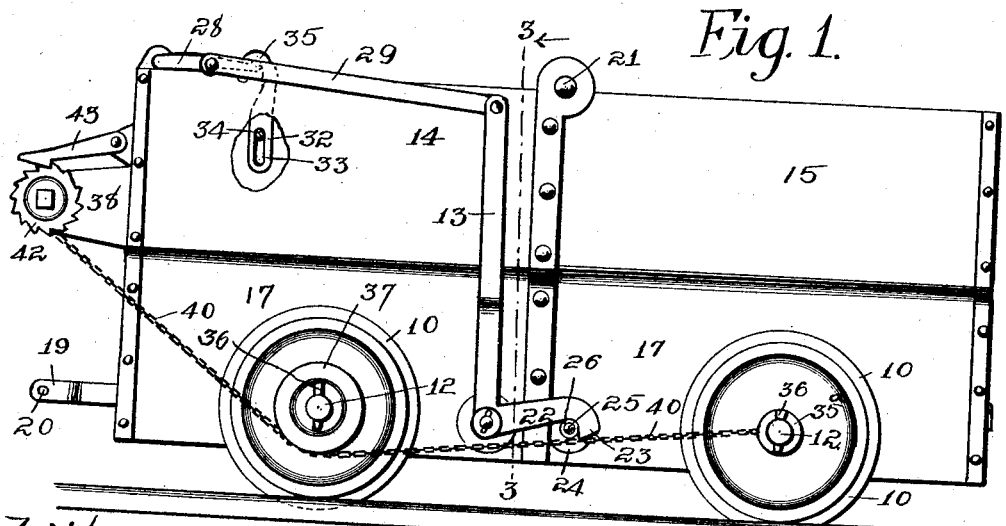
Witnesses
A. G. Hague
W. A. Loftus
Inventor,
Clarence J. Weston

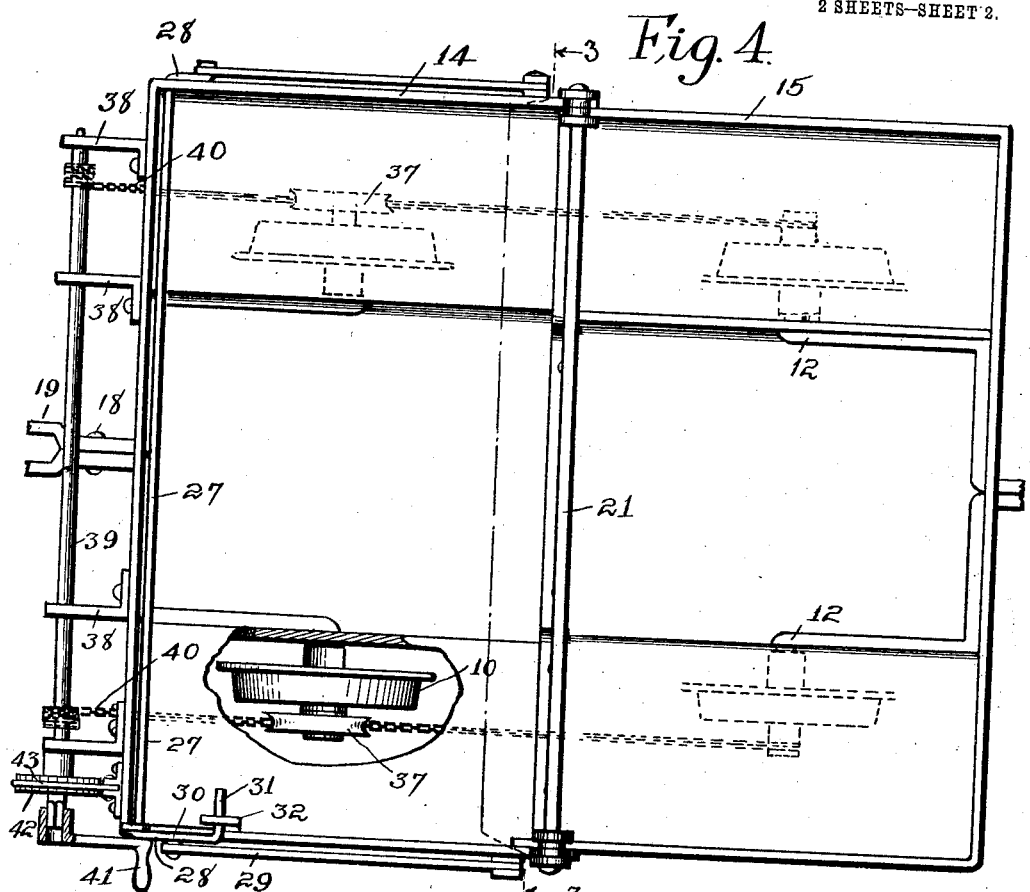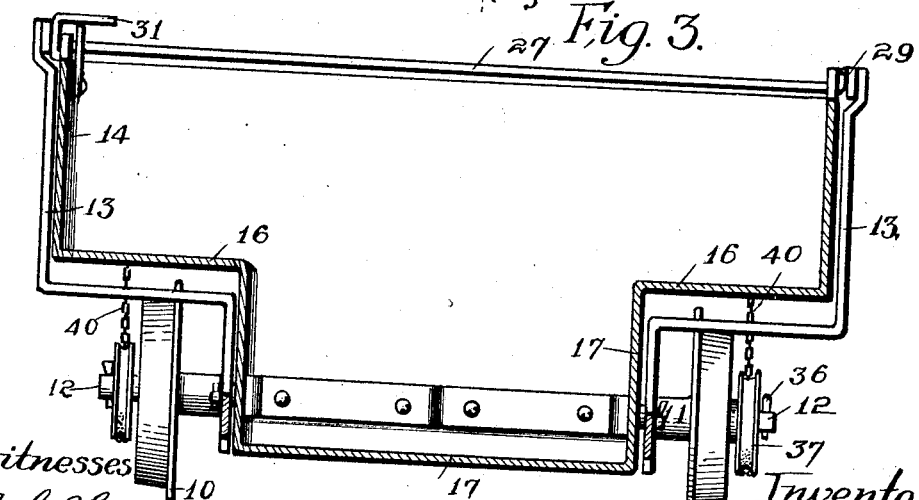

UNITED STATES PATENT OFFICE.

CLARENCE J. WESTON, OF FORT DODGE, IOWA.

DUMP-CAR.

1,058,649.   Specification of Letters Patent.   Patented Apr. 8, 1913.

Application filed April 11, 1912. Serial No. 690,166.

*To all whom it may concern:*

Be it known that I, CLARENCE J. WESTON, a citizen of the United States, residing at Fort Dodge, county of Webster, and State of Iowa, have invented a new and useful Dump-Car, of which the following is a specification.

The object of my invention is to provide a dump car of that general class in which the car is made in sections and discharges its contents through the bottom by swinging the sections apart.

More particularly, it is my object to provide a dump car of the general kind mentioned, of simple, durable and inexpensive construction, which is so mounted upon wheels that the car may be of minimum height, thus carrying the load as low over the track as possible.

A further object is to provide a dump car made in sections, hinged at the upper part of their inner ends and designed to discharge its load by gravity when the lower part of the inner ends of the car sections are permitted to move apart.

A further object is to provide simple, inexpensive and effective means whereby sections of the dump car may be secured together when in their closed position, which means may be easily and readily released to permit the discharge of a load.

A further object is to provide a dump car of the class mentioned, provided with additional means for securing the sections in their closed position, which means can also be employed for moving the car sections from their open discharging position to their closed position.

My invention consists in certain details, in the construction, arrangement, and combination of the various parts of my device, whereby the objects contemplated are attained, as hereinafter more fully set forth, pointed out in my claims, and illustrated in the accompanying drawings in which—

Figure 1 shows a side elevation of a dump car embodying my invention, in its closed position. Fig. 2 shows a side elevation of the same in partially open position. Fig. 3 shows a vertical, sectional view taken on the line 3—3 of Fig. 1. Fig. 4 shows a top or plan view of my improved dump car.

In the accompanying drawing, I have used the reference numeral 10 to indicate the wheels on which my car is mounted. The wheels 10 are provided with hubs 11 which are rotatably mounted on axles 12.

My car body comprises two sections which are indicated generally by the reference numerals 14 and 15. The upper part of the body sections 14 and 15 are preferably wider than the gage of the track on which the car is used. Above the wheels 10 the sections 14 and 15 are extended inwardly toward the center of the car forming shoulders 16 and the central portion 17 of each car section extends downwardly below the level of the axles 12. The axles 12 extend through the sides of the portions 17 of the car sections 14 and 15 as shown in Figs. 3 and 4 at points slightly nearer the outer ends of the car than the center thereof so that the greater part of the weight of each section is between the axles 12 and the center of the car. The axles 12 on the inside of the car sections are bent and extend along the sides of the car sections to the outer ends thereof preferably in a horizontal plane as shown in Figs. 3 and 4. At the outer ends of the car sections the axles 12 extend along the ends of the car sections in a horizontal plane, to the middle of the outer end of each section. The axles 12 are then bent and are extended through the ends of the car sections as shown in Fig. 4. Outside the car sections the axles 12 are secured together by bolts 18 and at their outer ends said axles are spread apart forming a fork 19 in the sides of which are openings 20 which register with each other. The forked portion 19 is designed to receive a link for coupling cars together. The link is secured in the forked portion 19 by means of a pin extended through the openings 20. At their upper inner ends, the car sections 14 and 15 are pivoted together. The said car sections may be pivoted together by any suitable means but I preferably use a transverse rod 21 rotatably mounted on the upper inner ends of the car sections and extending across the car as shown in Figs. 1 and 4.

For locking the car sections together when they are in their closed position, I have provided the following means: On each side of the portion 17 of the section 14, near the lower inner end thereof, I have pivoted a bell crank lever having one portion 22 which normally extends in approximately horizontal position past the end of the portion 17 of the car section 15. On the end of the portion 22 of the locking lever, now being described, I have provided a hook 23. Mounted on each side of the portion 17 of the car section 15 near the lower inner end thereof, is a bracket 24 in which is mounted an outwardly extending shaft 25 on which is a roller or rotatable sleeve 26. The roller 26 is so located that when the car sections are in their closed position, the hook member 23 may be moved to position to engage the roller 26 as shown in Fig. 1. The other end or arm 13 of the locking lever extends upwardly along the side of the car section 14 following the shoulder 16 to a point near the upper inner end of said car section 14. Rotatably mounted on the upper, outer end of the car section 14, is a transverse shaft 27 having formed on its ends, cranks 28. Links 29 are pivoted to the upper ends of the respective arms 13 of the locking levers and to the cranks 28 as shown in Figs. 1 and 4. One of the cranks 28 is provided with a longitudinal extension 30 on the end of which is an inwardly extending handle 31 which may be used for rotating the shaft 27 and thereby operating the locking levers.

For locking the handle 31 and thereby locking the car sections in their closed position, I have provided a catch device which may be made as follows: A hook 32 is provided at one end with a longitudinal slot 33 in which is received a pin 34 on the car section 14. The hook 32 is designed to rotate and slide freely on the pin 34. On the free end of the hook 32 is a catch member 35. The pin 34 is located approximately below the handle 31 when the latter is in its proper position for locking the car sections together. The catch member 35 is placed in engagement with the handle 31 as shown in Fig. 4 and the weight of the hook 32 will hold the catch member in proper position in such engagement. When it is desired to release the handle 31, the hook may be moved upwardly sliding freely on the pin 34 until said handle is released.

Under ordinary circumstances my car is so balanced that it can be readily moved from its open position as shown in Fig. 2 to its closed position shown in Fig. 1, by grasping the upper outer end of the car section 14 and putting the foot on the forked member 19, and pressing downwardly.

For unusual circumstances, such as when the car is on a side hill or is connected with a string of cars which must be moved in order to move the car sections of any one car from their open to their closed position, I have provided the following means: On the outer ends of the axles 12 of the car section 15, I have provided rotatably mounted collars 35ª which are held on the axles 12 by means of pins 36. On the outer ends of the axles 12 of the car section 14, I provide rotatably mounted grooved wheels 37 which are held on said axles by means of pins 36. On the outer end of the upper portion of the car section 14, I have provided rearwardly extending brackets 38 in the ends of which is rotatably mounted a transverse shaft 39. Secured to each of the collars 35ª is a chain 40 which passes under one of the grooved wheels 37 and is then wound on the shaft 39 to which it is secured, as shown in Figs. 1, 2 and 4. The outer end of the shaft 39 is made angular in form and on said outer end is mounted a crank handle 41 shown in Fig. 4. Fixed at a convenient point on the shaft 39 is a ratchet wheel 42. A pawl 43 is pivoted to the car section 14 and is designed to coact with the ratchet wheel 42. When the car sections are in their open position as shown in Fig. 2, the shaft 39 may be rotated by means of the handle 41 and the chains 40 may be wound upon said shaft, thereby drawing the car sections together and the shaft 39 will be held against rotation in opposite direction by means of the pawl and ratchet device. The pawl may be manually released for discharging the contents of the car. It will be noted that the ends of the chains 40 are secured to the shaft 39 at such points that during the first part of the operation of winding the chain on said shaft, the chains will be drawn under the pulleys 37.

In the practical use of my improved dump car, the car is locked by means of the locking lever and the hook 32 or if desired, by means of the chains and the mechanism connected therewith. The car is then filled with clay or the like and moved to the place where the load is to be discharged. It will be understood that my improved dump car is used in connection with receptacles located beneath the tracks on which the car travels. It has been noted that the location of the axle 12 with relation to the longitudinal axis of the car is such that a greater part of the load is carried between the axles and the middle of the car. It is also ordinarily true that the load in a car of this kind is piled higher in the middle than anywhere else. It therefore follows that when the car is over the receptacle, the pawl 43 may be released if the car is locked by the chains. If the car is locked by means of the locking lever, the hook 32 may be released and the handle 31 operated to raise the hook member 23. The weight of the load will then tend to lower the inner ends of the car sections and the lower ends of the car sections will be forced apart turning on the shaft 21 as a pivot. I have found in actual use of my car, that the clay or dirt gradually slides out without any sudden drop of the inner ends of the car sections. The portions 17 of the car sections, the locking lever, the roller 26 and adjacent parts are so located that the lower inner ends of the car sections are permitted to move to position considerably below the level of the track, thereby giving me what I call a large dumping angle. After the load has been discharged, the car sections may be moved to their closed positions by placing one foot on the forked member 19 and imposing weight thereon and by grasping the upper, outer end of the section 14 and holding the same against movement. When the car sections are in their closed position, the handle 31 may be moved to position shown in Fig. 4 and the catch member 35 can be placed in engagement with the said handle 31. If the car, after being unloaded, is on an inclined track or is connected with a string of cars, the sections can be moved to their closed position by means of the handle 41 and the mechanism connected therewith.

A great many changes in details of construction of my car may be made without departing from its essential features or purposes.

The advantages of my improved dump car are numerous. I build a car having a capacity, for instance, of one and one half yards, the height of which is twenty-four inches above the track. The ordinary cars now known having the same capacity are from six to twenty-four inches higher. My car thus has a maximum capacity combined with a minimum height above the track and this means a great saving of labor in filling the car, especially when the work is done by men with shovels. A steam shovel need not be lifted so high to discharge into my car, as with higher cars, thus saving time and wear on the machinery. The car is compact in form and the load is so located with relation to the axles that the center of gravity is low. My car is of cheap and simple construction and requires fewer parts and less weight in its manufacture than cars in which the body is located higher above the axles.

I claim as my invention:

1. In a device of the class described, first and second dump car sections, pivoted together at their upper inner ends, each of said sections having a downwardly extending central portion, opposite axles mounted in the downwardly extending portion of each section, nearer the outer than the inner end thereof and above the bottom thereof, and forming a rigid frame thereon, and wheels on said axles.

2. In a device of the class described, first and second dump car sections, pivoted together at their upper, inner ends, each of said sections having a downwardly extending central portion, opposite axles mounted in the downwardly extending portion of each section, nearer the outer than the inner end thereof and above the bottom thereof, and forming a rigid frame thereon, wheels on said axles, and means for securing said car sections in their closed position.

3. In a device of the class described, first and second dump car sections, pivoted together at their upper, inner ends, each of said sections having a downwardly extending central portion, opposite axles mounted in the downwardly extending portion of each section, nearer the outer than the inner end thereof, wheels on said axles, and means for securing said car sections in their closed position, said means comprising bell crank levers mounted on the lower sides of the inner end of the first of said sections, a hook on one end of each lever, means on the second section for engaging said hooks in one position of the movement of said levers.

4. In a device of the class described, first and second dump car section, pivoted together at their upper, inner ends, each of said sections having a downwardly extending central portion, opposite axles mounted in the downwardly extending portion of each section, nearer the outer than the inner end thereof, wheels on said axles, and means for securing said car sections in their closed position, said means comprising bell crank levers mounted on the lower sides of the inner end of the first of said sections, a hook on one end of each lever, means on the second section for engaging said hooks in one position of the movement of said levers, a link pivoted to the other end of each of said levers, a transverse shaft rotatably mounted near the upper outer end of the first section, cranks on the ends thereof pivoted to the respective links for operating said levers, a handle on one of said cranks.

5. In a device of the class described, first and second dump car sections, pivoted together at their upper, inner ends, each of said sections having a downwardly extending central portion, opposite axles mounted in the downwardly extending portion of each section, nearer the outer than the inner end thereof, wheels on said axles, and means for securing said car sections in their closed position, said means comprising bell crank levers mounted on the lower sides of the inner end of the first of said sections, a hook on one end of each lever, means on the second section for engaging said hooks in one position of the movement of said levers, a link pivoted to the other end of each of said levers, a transverse shaft rotatably mounted near the upper outer end of the first section, cranks on the ends thereof pivoted to the respective links for operating said levers, a handle on one of said cranks, and means for locking said handle in one position of its movement.

6. In a device of the class described, first and second dump car sections, pivoted together at their upper, inner ends, each of said sections having a downwardly extending central portion, opposite axles mounted in the downwardly extending portion of each section, nearer the outer than the inner end thereof, wheels on said axles, and means for securing said car sections in their closed position, said means comprising bell crank levers mounted on the lower sides of the inner end of the first of said sections, a hook on one end of each lever, means on the second section for engaging said hooks in one position of the movement of said levers, a link pivoted to the other end of each of said levers, a transverse shaft rotatably mounted near the upper outer end of the first section, cranks on the ends thereof pivoted to the respective links for operating said levers, a handle on one of said cranks, means for locking said handle in one position of its movement, said last means comprising a hook pivotally and slidably mounted beneath said handle and a catch member on said hook.

7. In a device of the class described, first and second dump car sections, pivoted together at their upper inner ends, each of said sections having a downwardly extending longitudinal central portion, opposite axles mounted in the downwardly extending portion of each section, nearer the outer than the inner end thereof and above the bottom thereof, and forming a rigid frame thereon, wheels on said axles, and means for moving said car sections from their open to their closed positions.

8. In a device of the class described, first and second dump car sections, pivoted together at their upper, inner ends, each of said sections having a downwardly extending central portion, opposite axles mounted in the downwardly extending portion of each section, nearer the outer than the inner end thereof, wheels on said axles, means for moving said car sections from their open to their closed positions, said means comprising a rotatably mounted collar on each axle of said second section, a grooved pulley on each axle of said first section, a transverse shaft rotatably mounted on the outer end of said first section near the upper end thereof, a chain secured to each of said collars and extending beneath one of said pulleys and secured to said shaft, a crank on said last named shaft, and means for securing said last named shaft against rotation in one direction.

Des Moines, Iowa, March 27, 1912.

CLARENCE J. WESTON.

Witnesses:
 BESS E. DEAL,
 M. WALLACE.

Copies of this patent may be obtained for five cents each, by addressing the "Commissioner of Patents, Washington, D. C."